United States Patent
Heald et al.

[11] Patent Number: 5,553,138
[45] Date of Patent: Sep. 3, 1996

[54] TELEPHONE LINE SOURCED POWER SUPPLY

[75] Inventors: Arthur D. Heald; Paul R. Fulton; Said S. Saadeh, all of Plano, Tex.

[73] Assignee: Compaq Computer Corporation, Houston, Tex.

[21] Appl. No.: 242,314

[22] Filed: May 13, 1994

[51] Int. Cl.[6] .................................................. H04M 19/00
[52] U.S. Cl. ............................ 379/413; 379/324; 379/58; 379/93
[58] Field of Search .................................. 379/413, 399, 379/156, 387, 442, 324, 372, 58, 93

[56] References Cited

U.S. PATENT DOCUMENTS

| | | | |
|---|---|---|---|
| 4,803,719 | 2/1989 | Ulrich | 379/399 |
| 4,961,220 | 10/1990 | Tentler et al. | 379/413 |
| 5,014,308 | 5/1991 | Fox | 379/413 |
| 5,160,851 | 11/1992 | McAndrews | 379/413 |
| 5,220,597 | 6/1993 | Horiuchi | 379/156 |
| 5,289,359 | 2/1994 | Ziermann | 379/413 |
| 5,327,493 | 7/1994 | Richmond et al. | 379/372 |

FOREIGN PATENT DOCUMENTS 2-20156  1/1990  Japan .................................. 379/413

OTHER PUBLICATIONS

Freer et al., "Local–Battery Charging over Subscribers' Lines", Jul. 1973, pp. 73–76, The Post Office Electrical Engineers' Journal, vol. 66, part 2.

Primary Examiner—Jeffery Hofsass
Assistant Examiner—Scott Wolinsky
Attorney, Agent, or Firm—Pravel, Hewitt, Kimball & Krieger

[57] ABSTRACT

In a telecommunication unit attached to a telephone line, power is provided by taking power from the telephone line when the unit is off-hook. When the unit remains on-hook, power is maintained to circuitry in the unit by a charge stored in a capacitor. When the capacitor's charge is reduced to a level no longer able to sustain operation of the unit, the unit is briefly taken off-hook, allowing the capacitor to recharge. Charge control of the capacitor is performed either by discrete circuitry or by a microcontroller, and further includes logic provisions preventing the unit from remaining off-hook for an unduly long period of time.

13 Claims, 7 Drawing Sheets

FIG. 4

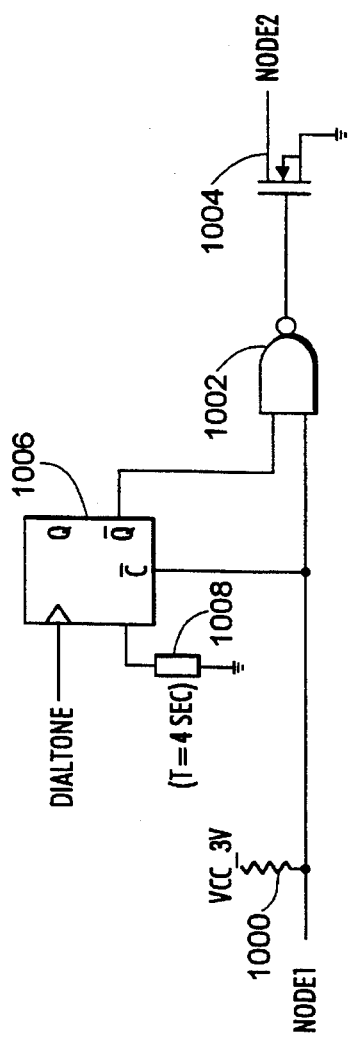
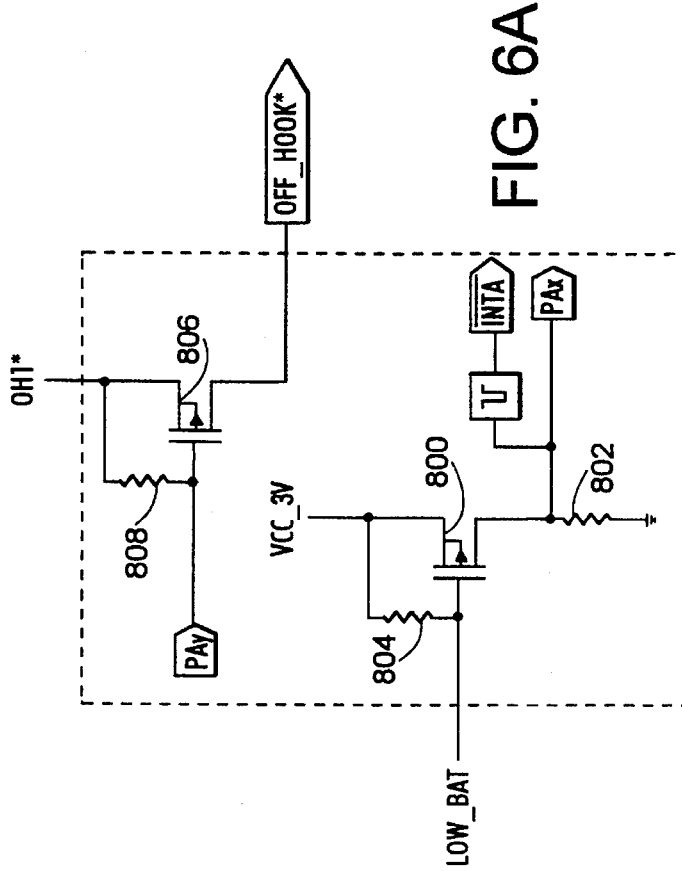
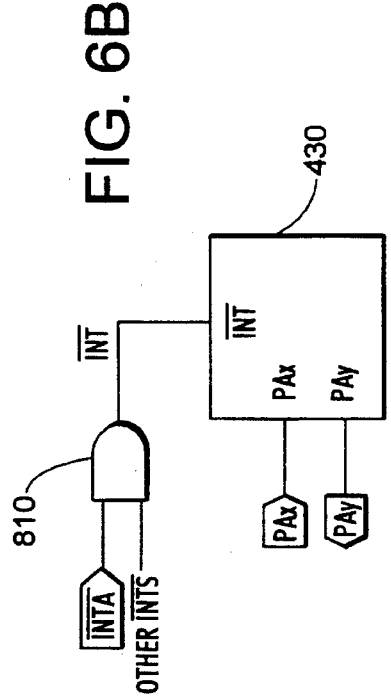

TELEPHONE LINE SOURCED POWER SUPPLY

BACKGROUND OF THE INVENTION

1. Field of the Invention

The invention relates to low-power power supplies, and more particularly to low-power power supplies capturing power from a telephone line.

2. Description of the Related Art

Mobile computers, particularly laptop computers and notebook computers, have become increasingly popular. They have performance and capabilities near that of a desktop unit, and if color active matrix liquid crystal displays are utilized, the display is as good as a desktop unit. When combined with the mobility, the popularity is quite understandable. However, one problem with using portable computers is that often they need to be connected to various equipment. For example, when located in a office, it is desirable to connect to various office wide items or non-portable items. For example, a network interface is often necessary, as is a SCSI port for use with various external devices such as CD-ROMs. This situation has conventionally been handled using expansion bases, which contain expansion cards for network and SCSI use and connections for a video monitor, a printer and a full size keyboard, or port replicator strips, which are used to simply provide the connections to the monitor, printer and keyboard without the need for expansion cards.

One of the computer applications which is becoming prevalent is electronic mail or E-mail. The modern business often has a local area network (LAN), with E-mail and appointment calendar applications. A remote user, such as the laptop user away from the office needs to check periodically to maintain in full contact. Thus, a very common addition to a portable computer is a modem to allow remote access to the LAN or other dial up services. Typically this modem is installed in the laptop computer, not directly in any expansion base. So while an expansion base or port replicator may alleviate certain wiring problems, as the various cables need not be disconnected or connected when removing or installing the portable computer, it does not resolve the wiring concerns in the case of a modem, where a separate telephone line is still required to be plugged and unplugged into the modem in the computer. This results in aggravation for the user. Further, this telephone line is yet another of the tangled mass of cables utilized with the modern computer. While the monitor, keyboard and SCSI cables are generally located right next to the computer to interconnect the various components, the telephone line often has to be strung across an office and thus is either unsightly or very difficult to route. This is a further drawback to standard conventional modem communications where the modem is contained in the personal computer, be it a laptop or a desktop unit.

Thus the use of a modem in a laptop computer results in aggravations for the user and additionally requires unsightly and cumbersome cabling. Therefore it is clearly desirable to simplify both the laptop portability concerns and the unsightly wiring problem. One solution to this problem is a cordless modem system where a mobile station unit (MSU) is located in the computer or connected to the computer and a base station unit (BSU) which is connected to the telephone line. A radio frequency (RF) link is developed between the two units to allow a cordless connection between the computer and the telephone line. Such a system is further disclosed in Ser. No. 08/242,122, filed concurrently herewith and now abandoned, entitled "Cordless Modem System Having Multiple Base and Remote Stations which are Interusable and Secure," and in Ser. No. 08/242,302, also filed concurrently herewith, entitled "Cordless Modem System Having Base and Remote Stations which is Communications Software Transparent." Both of these applications are incorporated by reference and have been commonly assigned to the assignee of the present application.

Yet another extraneous cable would conventionally be present in such systems, however. The BSU would typically be powered by connection to a wall outlet, thus requiring both the connection to that outlet as well as connection to the telephone line. It would be greatly desirable if such a BSU, and other telephone line interface equipment, did not require connection to a wall outlet for power, thereby reducing the number of cables and greatly simplifying installation of the BSU.

SUMMARY OF THE INVENTION

According to one embodiment of the invention, a telecommunication unit requiring power even when on-hook is powered using a charge storage device such as a capacitor. When the unit is on-hook, power is received from the capacitor. When the capacitor charge becomes too low, the unit goes off-hook for a brief period of time to recharge the capacitor. When the capacitor is sufficiently charged, the unit returns to normal operation. The unit remains functional even while the capacitor is being charged.

According to a further embodiment of the invention, a telecommunication unit is a base station unit used in a cordless base station-mobile station modem communication system.

According to yet another embodiment of the invention, the period in which the unit is taken off-hook is periodically interrupted to place the telephone back on-hook, even when the capacitor charge has not been restored. This is done to prevent the telephone system from perceiving the telephone line as being connected to a telephone that has been unintendedly left off-hook.

In one embodiment of the invention, the capacitor charge is restored using a voltage regulator which determines when a supply voltage has dropped below a predetermined level. The voltage regulator then causes a comparator to provide a low power indication signal. The comparator reverts to its normal state once the capacitor charge has been replenished to a predetermined level.

According to yet a further embodiment of the invention, the low power signal provided by the comparator is further provided to a microcontroller, which uses its processing capabilities to effectuate taking the telephone off-hook.

According to yet another embodiment of the invention, a dial tone signal detected by a DTMF controller is used to determine when the telephone has been off-hook so long that the dial tone is lost. When this occurs, either a monostable multivibrator is triggered forcing the unit back on-hook for a brief period of time, or the microcontroller performs the same function.

BRIEF DESCRIPTION OF THE DRAWINGS

A better understanding of the present invention can be obtained when the following detailed description of the preferred embodiment is considered in conjunction with the following drawings, in which:

FIGS. 6A and 6B are schematic diagrams of alternative circuitry that may be used in conjunction with the circuitry illustrated in FIG. 5;

FIG. 8 is a schematic diagram of circuitry similar to that shown in FIG. 5, but instead employing a dial tone signal to trigger a monostable multivibrator.

DETAILED DESCRIPTION OF THE PREFERRED EMBODIMENT

Figure 1:
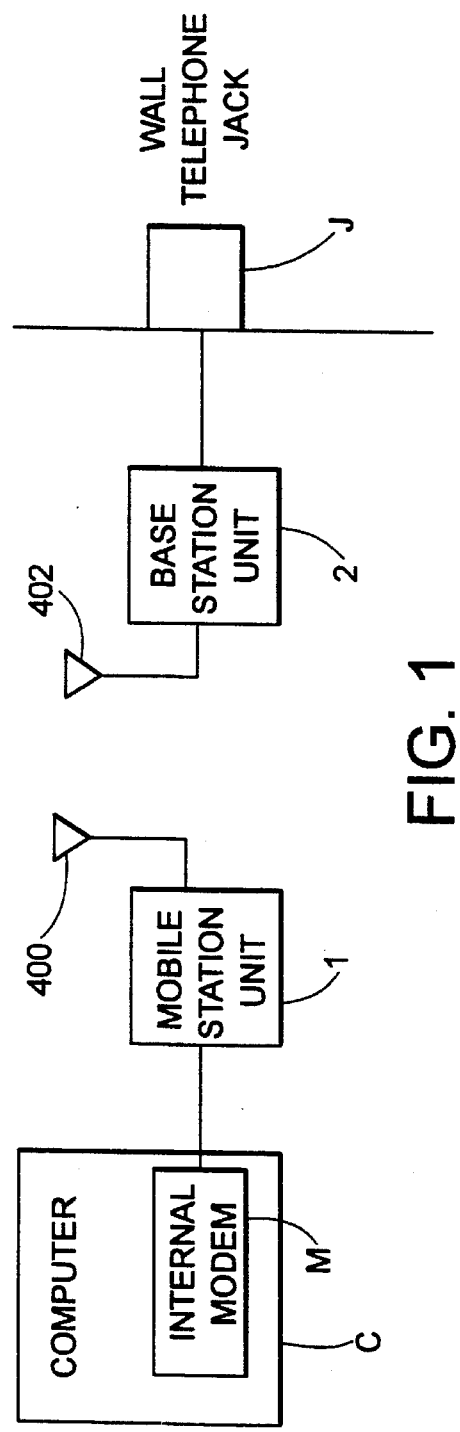
FIG. 1 is a block diagram showing the computer, cordless connection and telephone jack in which the present invention would typically be implemented.

Referring now to FIG. 1, the basic arrangement of the components in which the present invention would typically be implemented is shown. A computer system C, preferably a laptop or notebook computer but optionally a desktop computer, contains an internal modem M which is connected to a mobile station unit (MSU) 1. The MSU 1 includes an antenna 400. A telephone wall jack J is connected to a telephone land line. A base station unit (BSU) 2 is connected to the telephone jack J and also includes an antenna 402. A radio frequency (RF) link is established between the MSU 1 and the BSU 2 to pass information between the computer C and the telephone jack J. The MSU 1 contains a serialized identification number, preferably 24 bits long, as does the BSU 2. This allows the MSU 1 to have a unique identity to allow security of communications. Similarly, the BSU 2 also has this identification to allow a secure link to be established. The MSU 1 is connected to the internal modem M by several alternate connections. In a first embodiment the MSU 1 is configured as an external data access arrangement (DAA) and is connected to an external DAA port of the internal modem M. In this embodiment the MSU 1 is contained in a small box or case. In an alternate embodiment the MSU 1 and the internal modem M are combined into a single unit, preferably in a PCMCIA form factor. The BSU 2 is connected only to the telephone jack J and is not otherwise powered but receives power from the telephone line. This is further described below in conjunction with FIGS. 3–7. The BSU 2 is contained in a small box or case. The details of the MSU 1 and the BSU 2 are provided below.

The circuitry and methods according to the invention would typically be implemented in the BSU 2, as will be discussed below in conjunction with the remaining Figures.

Figure 2:
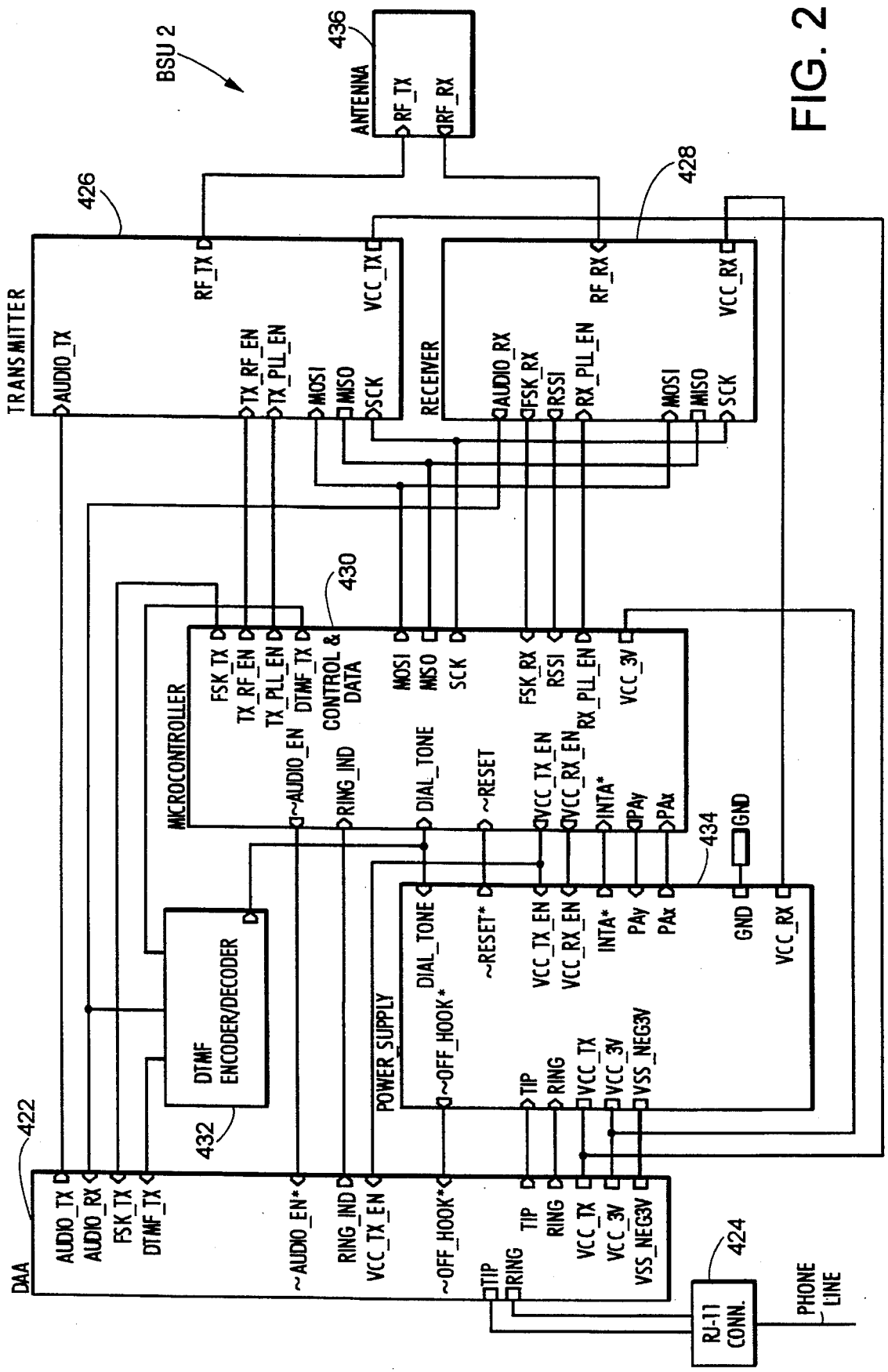
FIG. 2 is a block diagram of the base station unit of FIG. 1.

Referring now to FIG. 2, the block diagram of the BSU 2 is shown. An RJ11 connector 424 is provided in the BSU 2 to connect a data access arrangement (DAA) 422 to a telephone line. The DAA 422 is connected to a transmitter 426, a receiver 428, and microcontroller 430, a DTMF decoder/encoder 432, and a power supply 434. The power supply 434 is connected to the DAA 422 to receive power from the telephone line and to provide the proper voltages for operation of the BSU 2. The microcontroller 430, preferably the 68HC05 from Motorola, operates as the control point for the BSU 2. A DTMF decoder/encoder 432 is provided to allow signaling and dialing if necessary. An RF transmitter 426 is connected to properly frequency modulate the received audio signal and provide it to an antenna 436. The transmitter 426 is controlled by the microcontroller 430. A receiver 428 is connected to the microcontroller 430 and the antenna 436 to receive the RF signal from the MSU 1 and provide the audio signal to the DAA 422. The receiver 428 is similarly controlled by the microcontroller 430.

In this description an asterisk suffix is used to indicate a negative logic signal which is active when asserted low. The signal name without the asterisk means that it is the inverse of that signal with the asterisk.

Now the connections between the blocks will be described in more detail. The DAA 422 contains the necessary interface between the telephone line TIP and RING signals which it receives as inputs and the various other signals in the base station BSU 2. The TIP and RING signals are provided to the power supply 434 to allow the base station BSU 2 to be entirely powered by the telephone line, as is further described below in conjunction with FIGS. 3–7. The power supply 434 provides the desired 3 volt signal and transmitter 426 and receiver 428 voltages as necessary. The DAA 422 includes a two wire to four wire conversion to develop the RX signal and utilize the TX signal as is conventionally known. Details of this conversion are not included but an example is illustrated in U.S. Pat. No. 5,127,046, which is hereby incorporated by reference. In the DAA 422, the FSK_TX and DTMF_TX signals are utilized and combined with the audio signal received from the two to four wire converter to provide the AUDIO_TX signal. The AUDIO_EN* signal is used to clamp or disable the audio signal from the two to four wire converter and AUDIO_RX signals so that the microcontroller 430 can properly communicate with the MSU 1 during command operations. A RING_IND signal provided from the DAA 422 to the microcontroller 430 provides a ring detection indication which can be transmitted via a command to the MSU 1. The OFF_HOOK* signal is provided from the power supply 434 to the DAA 422 and is a combination of a VCC_TX_EN signal and a signal indicating that the power supply 434 needs recharged. Basically the power supply 434 includes a very large capacitor which is utilized to power the BSU 2 and the capacitor needs periodic recharging from the DC voltage present on the telephone line. When recharging is necessary, the power supply 434 causes the BSU 2 to go off-hook to charge the capacitor. Thus, the OFF_HOOK* signal is developed either by the power supply 434 for charging or by the microcontroller 430 when communications are desired based on the VCC_TX EN signal. This operation is described in further detail below in conjunction with FIGS. 3–7.

The power supply 434 provides a 3 volt output for operation of the circuitry of the preferred embodiment, to save power, and provides VCC_TX and VCC_RX signals which provide power to the transmitter 426 and the receiver 428 so that they can be completely powered down when not in operation. To that end, the VCC_TX EN and VCC_RX_EN signals are received from the microcontroller 430 to control or enable the VCC_TX and VCC_RX outputs. The power supply 434 also provides the RESET* signal to the microcontroller 430 to reset the operation of the BSU 2 when the power supply is inadequate. In one embodiment, the power supply 434 also provides an INTA* signal to the microcontroller 430. This signal is coupled with the power supply's low power logic, and provides an interrupt to the microcontroller 430 indicating the on-hook storage capacitor needs to be recharged. Similarly, two control lines, PAx and PAy are provided between the power supply 434 and the microcontroller 430. As is discussed below in conjunction with FIGS. 6A and 6B, these signals are further used to allow the microcontroller 430 to control the recharging of the storage capacitor in the power supply 434.

The DTMF decoder/encoder 432 provides the DTMF_TX output, which is used if dial tones are desired, and receives the AUDIO_RX signal from the receiver 428 to allow decoding of any received DTMF signals. The DTMF decoder/encoder 432 is connected to the microcontroller 430 through data and control signals so that the decoder/encoder 432 can interrupt the microcontroller 430 when a detected DTMF code is received and can provide a bi-directional data and control port. Further, the DTMF decoder/encoder 432 also preferably provides a DIAL_TONE signal to the microcontroller 430, the POWER_SUPPLY 434, or both, to facilitate the use of circuitry and routines described below in conjunction with FIGS. 8 and 9.

The transmitter 426 includes a radio frequency phased-locked loop (PLL) synthesizer (not shown) which includes a serial interface. The PLL receives command and setup data from a serial data link comprised of the signals MOSI, MISO and SCK from the microcontroller 426. The SCK signal is the clock signal while the other two signals are for the data input and data output. The serial interface allows the microcontroller 430 to properly program the PLL contained in the transmitter 426 to the desired frequency of channel 1 or channel 2. The output of the PLL is then provided to appropriate mixing circuitry to mix in the AUDIO_TX signal to produce the RF_TX signal, which is provided to the antenna 436. The antenna 436 can either be an integrated antenna or a short external antenna. Additionally, the microcontroller 430 provides the TX_RF_EN and TX_PLL_EN signals to the transmitter 426. The TX_PLL_EN signal is used to enable or disable the PLL when desired, while the TX_RF_EN signal disables the actual output of the transmitter 426 which is provided to the antenna 436. This allows the PLL to be activated or turned on in preparation for a transmission which is to occur.

The receiver 428 includes a similar PLL, preferably the MC145170 from Motorola Semiconductor. The receiver 428 includes the MOSI, MISO and SCK signals. The receiver 428 receives the VCC_RX signal from the power supply 434 to allow it to be completely powered down. An RX_PLL_EN signal is provided from the microcontroller 430 to receiver 428 to disable the PLL in the receiver 428. The receiver 428 also includes a mixer FM IF system, preferably the NE/SA606 from Phillips Semiconductor. The mixer FM IF system receives an RF_RX signal from the antenna 436 and properly mixes out the channel receive frequency so that only the received audio data is present. This is provided as the AUDIO_RX signal to the DTMF decoder/encoder 432 and the DAA 422. An FSK_RX signal is a buffered version of the AUDIO_RX signal and is provided to a serial input of the microcontroller 430. Thus the FSK_TX and FSK_RX signals are serial output and input of the microcontroller 430. This serial interface of the microcontroller 430 is the command interface with the MSU 1. Preferably the serial interface operates at a low speed, such as 1200 or 2400 baud. The receiver 428 also provides an RSSI or receive signal indication to the microcontroller 430 to indicate that the carrier is being received from a MSU 1 and that a channel is active. This allows the BSU 2 to monitor for a received signal indicating that a given channel is busy.

Thus the BSU 2 provides the capability to receive analog audio data from the telephone line and provide it over an FM modulated RF link to the base station MSU 1 and to similarly receive an RF signal from the MSU 1 and decode the signal to provide an analog signal to the telephone line. The microcontroller 430 provides the control function which is needed for the DAA 434 and allows command passing between the BSU 2 and MSU 1.

Figure 3:
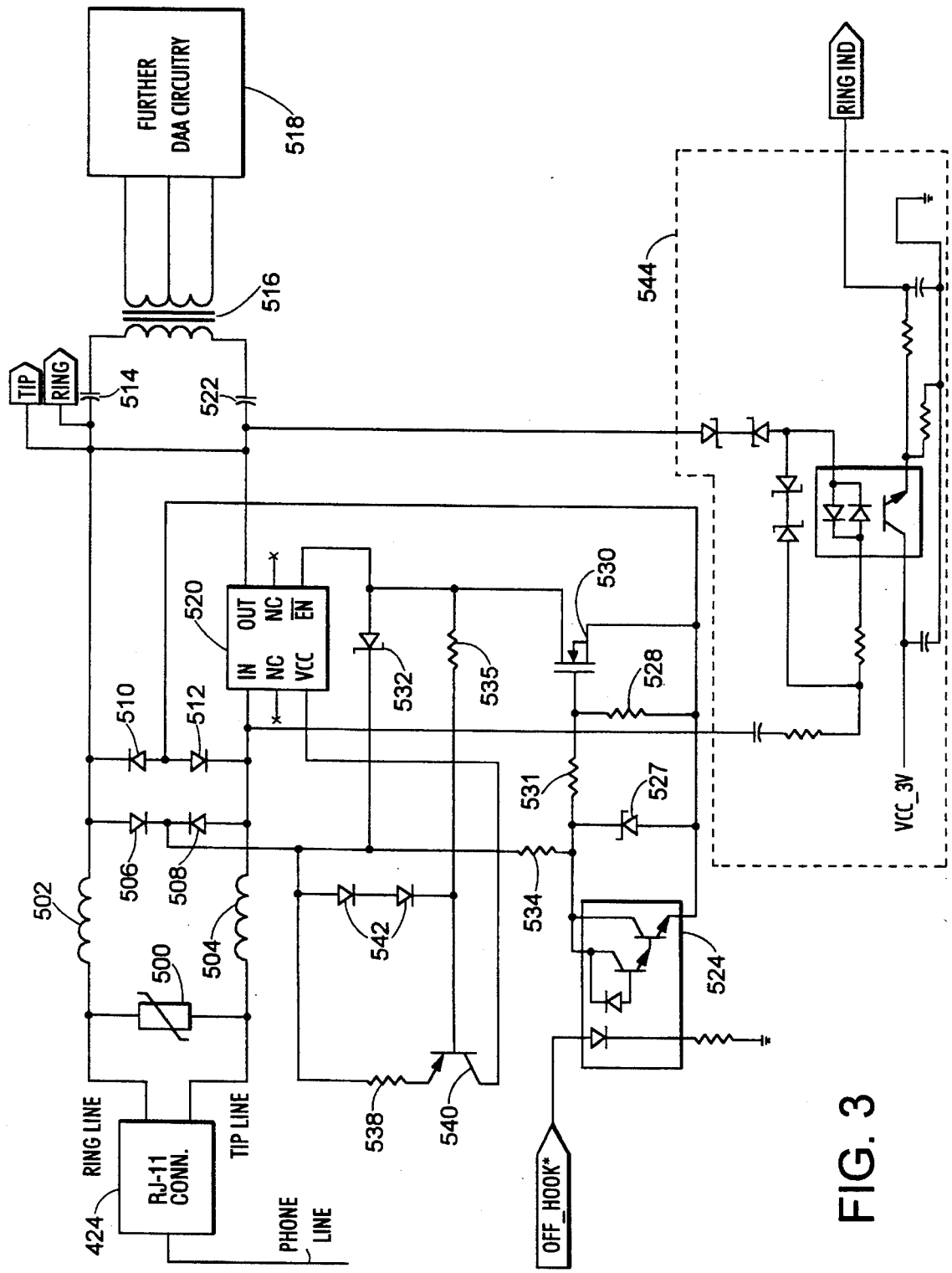
FIG. 3 is a schematic diagram illustrating the off-hook circuitry used in the base station unit of FIG. 1.

Referring now to FIG. 3, circuitry illustrating the telephone line interface in the DAA 422, as well as the circuitry for taking the BSU 2 off-hook, are shown. The telephone line is provided through the RJ11 connector 424, which provides standard TIP and RING lines for communications. The signals on these lines are well known in the art, but to review, from a 48 volt DC wire loop, which when connected to data access arrangement circuitry, results in the BSU 2 being taken "off-hook." Ringing is indicated by an approximately 85 volt, 20 Hz signal superimposed on the 48 volt signal. These are standard values for the telephone line operation and numerous variations are known, such as a 24 volt PBX system. In all cases, a DC voltage is present on the TIP and RING lines, and closing the loop results in an off-hook condition.

A transorb 500 is provided across the TIP and RING lines to clamp voltage spikes. After being filtered through inductors 502 and 504, the signals on the TIP and RING lines are then provided to a rectifier bridge formed by rectifier diodes 506, 508, 510 and 512. The cathodes of the rectifier diodes 506 and 508 are connected to provide the rectified high signal from the telephone line, while the anodes of the rectifier diodes 510 and 512 are connected to provide a low reference level from the telephone line. The RING line, as filtered through the inductor 502, is provided as a RING signal and is further provided through a capacitor 514 to a transformer 516. This transformer couples to standard DAA circuitry 518, which communicates over the telephone line. The signal on the TIP line, as filtered through the inductor 504, is further provided to the input of a solid state relay 520. The output of the solid state relay 520 is provided as a TIP signal and is further provided through a capacitor 522 to the other side of the transformer 516 as the TIP signal.

The solid state relay 520 turns on when an appropriate voltage drop is developed across its VCC and EN* inputs. When so energized, the solid state relay 520 effectively couples the DAA circuitry 518 to the telephone line, thus taking the BSU 2 off-hook.

The circuitry used to take the BSU 2 off-hook is activated by an OFF_HOOK* signal, provided as an input to an opto-isolated switch 524. The cathode of the light emitting diode in the opto-isolated switch 524 is connected to ground through a current limiting resistor 526. The light emitting diode acts on a photo-diode in the base loop of a Darlington transistor pair so that when the light emitting diode is active, the transistor pair is saturated. Thus, when OFF_HOOK* goes true, or active low, the opto-isolated switch 524 becomes an open circuit, whereas when OFF_HOOK* goes false, or high, it becomes an effective short circuit.

The emitter and collector of the transistor pair in the opto-isolated switch 524 are clamped by a Zener diode 527, thus limiting the emitter-collector drop. The collector of the opto-isolated switch 524 is further connected to one terminal of a pull-down resistor 528, to the source of an N-channel MOSFET 530, and to the rectified low side of the telephone line through the rectifier diodes 510 and 512. The emitter of the opto-isolated switch 524 is connected to the gate of the N-channel MOSFET 530 through a resistor 531, and is also connected to one terminal of a pull-up resistor 534, the other terminal of which is connected to a rectified high side of the telephone line through the rectifier diodes 506 and 508. The gate of the N-channel MOSFET 530 is further connected through the resistor 528 to the rectified low side of the telephone line through the rectifier diodes 510 and 512. The drain of the N-channel MOSFET is connected to the active low enable input, EN*, of the solid state relay 520, and is further connected to the anode of a Zener diode 532 and to one terminal of a current limiting resistor 535.

The rectified high side of the telephone line as provided by the rectifier diodes 506 and 508 is connected to the cathode of the Zener diode 532, to the resistor 534, and through a current limiting resistor 538 to the emitter of a PNP transistor 540. The base of the PNP transistor 540 is connected through the cathodes of two diodes 542 to the rectified high side of the telephone line provided by the rectifier diodes 506 and 508. The base of the PNP transistor 540 is also connected to the resistor 535. The collector of the PNP transistor 540 is connected to VCC input to the solid state relay 520. Thus, the PNP transistor 540 provides the drive for energizing the solid state relay 520, while the N-channel MOSFET 530 provides the current sink to energize the solid state relay 520. Of note, using this circuitry, the resistor 538, the diodes 542, and the PNP transistor 540 form a constant current source for the solid state relay 520. This is desirable because it causes this circuitry to appear as a high impedance load to the AC signal formed by the TIP signal and the RING signal.

This portion of the circuitry shown in FIG. 3 operates as follows. When OFF_HOOK* goes true, or active low, the opto-isolated switch 524 becomes an open circuit. The gate of the N-channel MOSFET 530 is then pulled high, turning the N-channel MOSFET 530 on, causing it to tie the EN* input of the solid state relay 520 to the rectified low side of the telephone line through rectifier diodes 510 and 512. At the same time, the N-channel MOSFET 530 pulls the base of the PNP transistor 540 low, turning that PNP transistor 540 on, providing power to VCC of the solid state relay 520. This energizes the solid state relay 520, internally coupling IN to OUT, thereby coupling the telephone line to the DAA circuitry 518 through the transformer 516. Thus, the BSU 2 is taken off-hook.

When OFF_HOOK* goes false, or active high, the opto-isolated switch 524 becomes an effective short, pulling the gate of the N-channel MOSFET 530 low, and thus turning it off. The base of the PNP transistor 540 is then pulled high through the Zener diode 532, turning the PNP transistor 540 off. This causes the voltage drop to disappear across VCC and EN* of the solid state relay 520, thereby de-energizing that relay. This decouples the DAA circuitry 518 from the telephone line, placing the BSU 2 in an on-hook state.

This off-hook circuitry can operate with very low supply current—less than 10 microamps. This allows the circuitry to take the BSU 2 off-hook using the low power present on the telephone line when the BSU 2 is on-hook. This makes the unit "self starting" in the sense that when the unit is unpowered, plugging it into the telephone line causes the BSU 2 to go off-hook immediately to charge up a storage capacitor discussed below in conjunction with FIG. 4.

The remaining circuitry 544 is used to provide a RING indication signal RING_IND. The circuitry is well known in the art, and is not particularly pertinent to this discussion.

Figure 4:
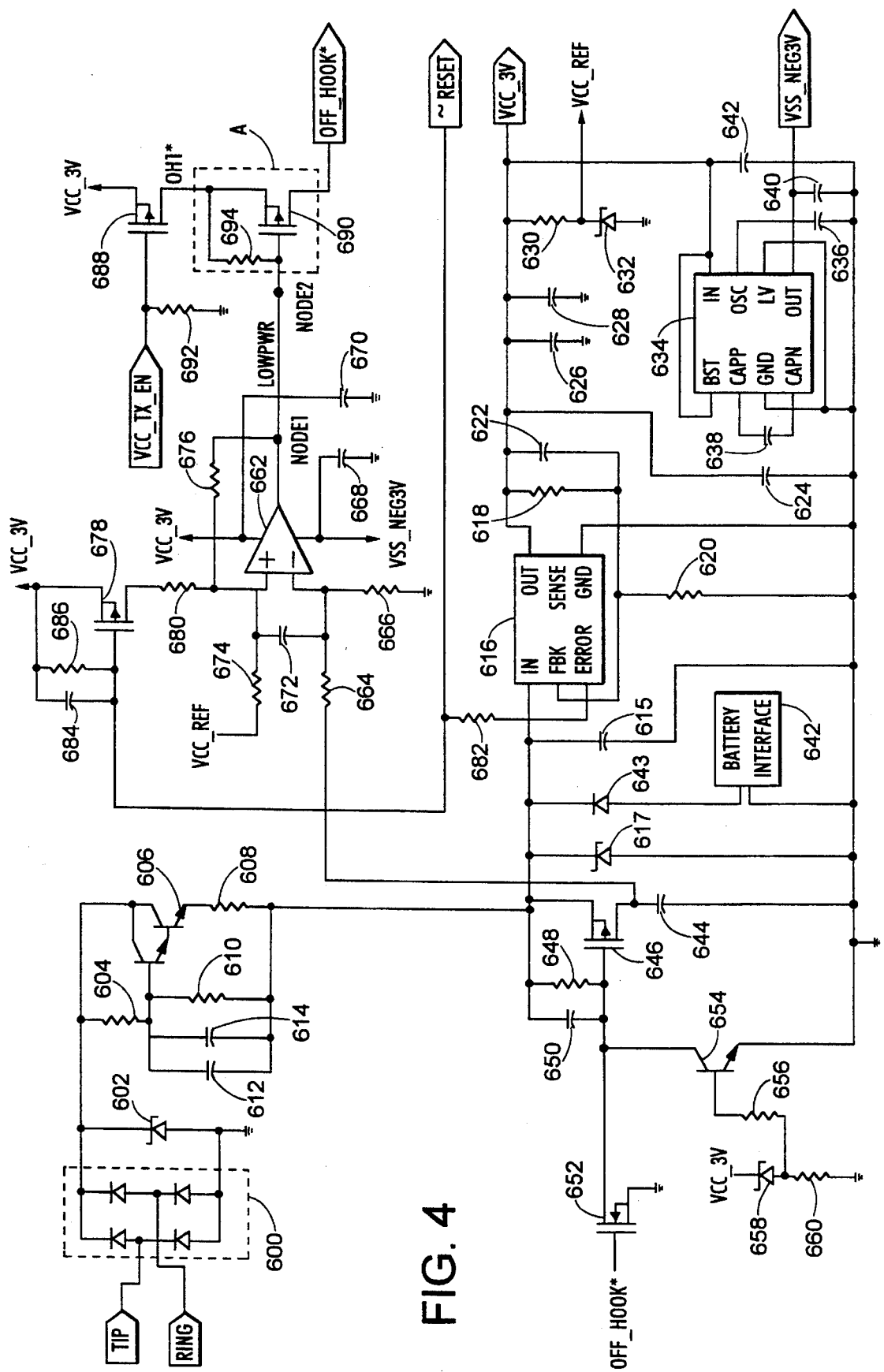
FIG. 4 is a schematic diagram of the power supply circuitry used in the base station unit of FIG. 1.

Turning to FIG. 4, a portion of the circuitry in the power supply 434 of the BSU 2 is shown. A 5 volt supply, VCC_5V, is generally provided by taking power from the TIP and RING signals when the BSU 2 is off-hook. The TIP and RING signals, previously illustrated in FIG. 3, are rectified through a rectifier diode bridge 600. The voltage drop across this bridge 600 is limited by a Zener diode 602, the anode of which is connected to ground and the cathode of which is connected to the high side of the rectifier bridge 600. The rectified high signal provided at the cathode of Zener diode 602 is provided to a biasing resistor 604 and to the emitter of a Darlington pair 606. The other terminal of the biasing resistor 604 is connected to the base of the Darlington pair 606. The collector of the Darlington pair 606 provides VCC_5V through a current limiting resistor 608. The base of the Darlington pair 606 and VCC_5V are further coupled through a resistor 610 and filtering capacitors 612 and 614. VCC_5V is filtered to ground through a capacitor 615, and is clamped by a Zener diode 617 to prevent over voltage conditions.

VCC_5V is used to generate a filtered 3 volt supply, VCC_3V, through a low power regulator 616. This regulator is typically an LP2951. VCC_5V provides the input voltage to the regulator 616, and VCC_3V is provided as the output. To achieve a 3 volt output, the feedback input of the regulator 616 is connected to an appropriate resistor bridge formed by resistors 618 and 620. To prevent oscillation, VCC_3V is also connected to the feedback input of the regulator 616 through a capacitor 622. The ground line of the regulator 616 is further coupled to ground, and the ERROR* output is provided as an error signal to be discussed below. VCC_3V is filtered by coupling to ground through filtering capacitors 624, 626, and 628.

VCC_3V is also used to generate a voltage reference. VCC_3V is provided through a current limiting resistor 630 to the cathode of a 1.235 volt precision Zener diode 632, the anode of which is connected to ground. The cathode of the Zener diode 632 thus provides a precision reference voltage VCC_REF, preferably at 1.235 volts.

A negative 3 volt supply VCC_NEG3V is generated by a voltage converter 634, which is typically an LTC1044. VCC_3V is connected to the IN and BST inputs of the voltage converter 634, the OSC input is connected to ground through a capacitor 636, the CAPP and CAPN inputs are coupled by a capacitor 638, and the GND and LV inputs are connected to ground. In this configuration, the voltage converter 634 provides a −3 volt supply (VCC_NEG3V) at its OUT output, which is filtered to ground through a capacitor 640. Finally, the input of the voltage converter 634 is also filtered to ground through another capacitor 642.

Thus, the low power regulator 616 and the voltage converter 634 provide appropriate ±3 volt supplies to be used by the remainder of the circuitry as discussed and illustrated in FIG. 2. Generating these supplies is no problem when the BSU 2 is off-hook. During such periods, the telephone line supplies sufficient power for all circuitry components. But how about when the BSU 2 is on-hook? The circuitry is very low power, so it does not require much power to continue to operate and receive signals from MSU 1. But it does need some power. This could be provided by a battery, but that solution requires added weight, expense, and circuitry. So a different solution is instead chosen.

Because of the low power requirements of the BSU, a storage capacitor 644 is instead generally used to supply the voltage and current necessary to drive the voltage regulator 616 and the voltage converter 634. This capacitor is typically a one Farad capacitor, thus capable of storing a good deal of energy. The storage capacitor 644 could be directly tied to VCC__5V. The problem then becomes what happens if the BSU 2 stays on-hook for so long that the capacitor is drained of charge to the point that it cannot supply sufficient voltage to the regulator 616.

To eliminate this possibility, circuitry is used to cause OFF__HOOK* to go true, or low, when the storage capacitor 644 loses its charge. Further, this circuitry also relies on the ERROR* output of the regulator 616. The ERROR* output typically goes true, or low, when the output voltage of the regulator 616 drops 5% below the desired regulated value. As is seen in the discussion below, the disclosed embodiment maintains sufficient capacitor charge through a combination of using the ERROR* signal from the regulator 616 as well as directly determining the charge of the storage capacitor 644.

When the output of the regulator 616 drops too low, the circuitry causes OFF__HOOK* to go low, or true. It remains low until the capacitor has sufficiently charged, at which time OFF__HOOK* is then controlled as normal—that is, the microcontroller 430 manipulates OFF__HOOK* depending on the need to communicate on the telephone line. Various other embodiments are further detailed in which the microcontroller 430 directly controls OFF__HOOK*, at the same time preventing the BSU 2 from remaining off-hook for too long.

As a preliminary matter, circuitry is used to more directly couple and decouple the storage capacitor 644 to and from VCC__5V. The storage capacitor 644 is connected between ground and the source of a P-channel MOSFET 646. As is typically true with MOSFETs, the P-channel MOSFET 646 has an inherent diode between its source and drain. The drain of the P-channel MOSFET 646 is connected to VCC__5V, so when no power is being supplied by the TIP and RING signals, the storage capacitor 644 would typically supply voltage to VCC__5V through that diode. It is sometimes desirable, however, to drive the gate of the P-channel MOSFET 646 to provide a more direct connection between VCC__5V and the storage capacitor 644.

circuitry is provided to activate the P-channel MOSFET 646 in two instances: first, when the BSU 2 is on-hook; second, when VCC__5V is at least 5.0 volts. The gate of the P-channel MOSFET 646 is pulled up through a resistor 648 to VCC__5V, and further includes a filtering capacitor 650 coupling the gate to VCC__5V. An N-channel MOSFET 652 is provided with its gate driven by OFF__HOOK*. The source of the N-channel MOSFET 652 is connected to ground, and the drain is connected to the gate of the P-channel MOSFET 646.

When OFF__HOOK* goes high, or false (the BSU 2 is on-hook), the N-channel MOSFET 652 turns on, causing the P-channel MOSFET 646 to turn on. This more directly couples the storage capacitor 642 to VCC__5V when no power is being supplied through TIP and RING by lessening the voltage drop across the P-channel MOSFET 646 in such a case, providing for more efficient use of the energy stored in the storage capacitor 644.

The gate of the P-channel MOSFET 646 is further connected to the emitter of an NPN transistor 654. The collector of the NPN transistor 654 is connected to ground, and the base is connected to a current limiting resistor 656. The current limiting resistor 656 is connected to the anode of a 4.3 volt Zener diode 658, the cathode of which is connected to VCC__5V. A biasing resister 660 connects the anode of the Zener diode 658 to ground. Thus, the base of the NPN transistor 654 is provided with 0.7 volts when VCC__5V is at 5.0 volts. This circuitry provides 5 volt regulation for VCC__5V even when the storage capacitor 644 is not charged.

This circuitry combines to prevent the storage capacitor 644 from losing charge when the BSU 2 is off-hook and maintains a full 5 volts to VCC__5V as long as the BSU 2 is off-hook.

The voltage across the capacitor 644 is monitored by a comparator 662. The voltage across the storage capacitor 644 is divided across a high impedance resistor network formed by resistors 664 and 666. This divider supplies the storage capacitor 644 voltage, $V_C$, times approximately 0.28 to the inverting input of the comparator 662. The comparator 662 is an open collector output device, and receives VCC__3V and VCC__NEG3V as its supply voltages. These supplies are further filtered by filtering capacitors 668 and 670. A capacitor 672 is provided across the inverting and non-inverting inputs of the comparator 662 to prevent oscillation.

VCC__REF is provided to the non-inverting input of the comparator 662 through a resistor 674. The output of the comparator 662 further provides hysteresis feedback to the non-inverting input of the comparator 662 through a resistor 676. The resistor 676 will typically be large compared to the resistor 674, for example 1M ohm compared to 150K ohm.

The non-inverting input of the comparator 662 is further connected to the source of a P-channel MOSFET 678 through a current limiting resistor 680. The current limiting resistor 680 will typically be a low value compared to the resistors 674 and 676, such as 10K ohm. The drain of the P-channel MOSFET 678 is connected to VCC__3V, and the gate is driven by a RESET* signal, which is simply the ERROR* output of the regulator 616 current limited by a resistor 682. The gate of the P-channel MOSFET 678 is further pulled up to VCC__3V through a resistor 684 and is filtered by a capacitor 686 to VCC__3V.

The output of the comparator 662 is provided as a low power signal LOW__PWR. This is an open-collector based signal, which the comparator 662 drives to VSS__NEG3V, or −3 volts, when the inverting input voltage of the comparator 662 is greater than the non-inverting input voltage. When the converse is true, the output of the comparator 662 goes open, presenting a high impedance output.

Thus when the capacitor 644 voltage goes below a predetermined level, the LOW__PWR signal is asserted. Similarly, when the RESET* signal is asserted, the LOW__PWR signal is also asserted.

Turning now to the specific generation of OFF__HOOK*, it is first noted from FIG. 3 that OFF__HOOK* is tied to the pull-down resistor 526. Thus, it is normally low, or true. When OFF__HOOK* is pulled up, or is false, then the BSU 2 goes on-hook.

With this in mind, two P-channel MOSFETs 688 and 690 perform this pull-up function. When either of the P-channel MOSFETs is off, OFF__HOOK* goes low, or true. The drain of the first of these P-channel MOSFETs 688 is tied to VCC__3V and its gate is driven by a transmit voltage enable signal VCC__TX__EN which is generated by the microprocessor 430 as illustrated in FIG. 2. VCC__TX__EN is pulled low by a pull-down resistor 692 and is also provided to other portions of the power supply 434 to enable or disable supply voltage to the transmitter 426 in FIG. 2. When true, VCC__TX__EN causes the P-channel MOSFET 688 to turn off, forcing OFF__HOOK* low, or true. This is necessary because transmitting requires quite a bit of power, so it is always preferable to have the telephone line provide power during transmit cycles.

The source of the P-channel MOSFET 688 is connected to the drain of the P-channel MOSFET 690. The drain and gate of the P-channel MOSFET 690 are further connected by a pull-up resistor 694. The gate of the P-channel MOSFET 690 is also driven by LOW_PWR, and the source provides OFF_HOOK*. When LOW_PWR is true, the P-channel MOSFET 690 turns off, again forcing OFF_HOOK* low, or true. When LOW_PWR is low, or false, the gate of the P-channel MOSFET 690 goes to the level of the source of the MOSFET 688, turning it on if the MOSFET 688 is turned on. In this case, the state of OFF_HOOK* is solely dependent on the state of the P-channel MOSFET 688 tied to VCC_TX_EN.

Now how the system operates. Assume that the BSU 2 is on-hook, and thus no power is being supplied over the TIP and RING signals. In that case, the P-channel MOSFET 646 is on, and power to the regulator 616 is provided by the storage capacitor 644. This state continues until so much energy is drained from the storage capacitor 644 that the output voltage of the regulator 616 drops 5% from 3 volts, or to approximately 2.85 volts. At this point, the ERROR* output of the regulator 616 goes low, forcing RESET* low. This causes the P-channel MOSFET 678 to turn on, pulling the non-inverting input of the comparator 662 to 3.0 volts. This will be much higher than the inverting input of the comparator 662, because the highest normal voltage for the inverting input of the comparator 662 will be 5.0 volts×0.28, or 1.39 volts. Because the non-inverting input is higher than the inverting input, the output of the comparator 662 floats, which causes the P-channel MOSFET 690 to turn off. OFF_HOOK* then goes true, or high.

Once the BSU 2 is off-hook, power is supplied over the TIP and RING signals, causing VCC_5V to rise to at least 5.0 volts. The regulator 616 then returns to its normal operating voltage, and RESET* again goes false, or high. This turns off the P-channel MOSFET 678, and results in the non-inverting input of the comparator 662 being driven to VCC_REF as adjusted by the hysteresis provided by the resistor 676 and the resistor 694, approximately 1.43 volts. LOW_PWR, however, stays true until the inverting input of the comparator 662 rises above the voltage level of the non-inverting input of the comparator 662. This occurs when $V_C$, the voltage across the storage capacitor 644, rises to approximately 5.10 volts.

When this happens, the comparator 662 output drives negative, to −3.0 volts. This forces LOW_PWR false, or low, turning the P-channel MOSFET 690 on, permitting OFF_HOOK* to go low. The comparator 662 output then also provides hysteresis through the resistor 676 to the non-inverting input, forcing that non-inverting input to 0.68 volts. This prevents oscillation when $V_C$ is near its preferred charge level.

If the microcontroller 430 then asserts VCC_TX_EN, the MOSFET 688 is turned off, so the phone line goes off-hook. The voltage of VCC_5V is then satisfactory and the MOSFET 646 regulates, charging the capacitor 644 even though it is not at a low enough level to cause low voltage activation of OFF_HOOK*. When the microcontroller 430 negates the VCC_TX_EN signal, the MOSFET 688 again turns on, so the MOSFET 690 is turned on, negating OFF_HOOK* high and causing the BSU 2 to go on-hook. Thus, when the capacitor 644 is sufficiently charged, the microcontroller 430 controls the on- or off-hook status using the MOSFET 688, but when the voltage on the capacitor 644 is too low, the BSU 2 goes off-hook based on the action of the comparator 662 and the MOSFET 690, irrelevant of the state of the MOSFET 688.

Thus, the above circuitry causes the BSU 2 to go off-hook when $V_C$ falls below a value sufficient to keep the regulator 616 operating within its margins. That capacitor is then charged until it reaches 5.10 volts. The BSU 2 can then return to its on-hook state.

As a final note to FIG. 4, circuitry block A can be replaced with substitute circuitry discussed below in conjunction with FIGS. 6A and 6B to form an alternative embodiment of the invention. Similarly, circuitry discussed in FIG. 5 can be connected between node 1 and node 2 shown in FIG. 4 to again provide features of a further embodiment of the invention.

Figure 5:
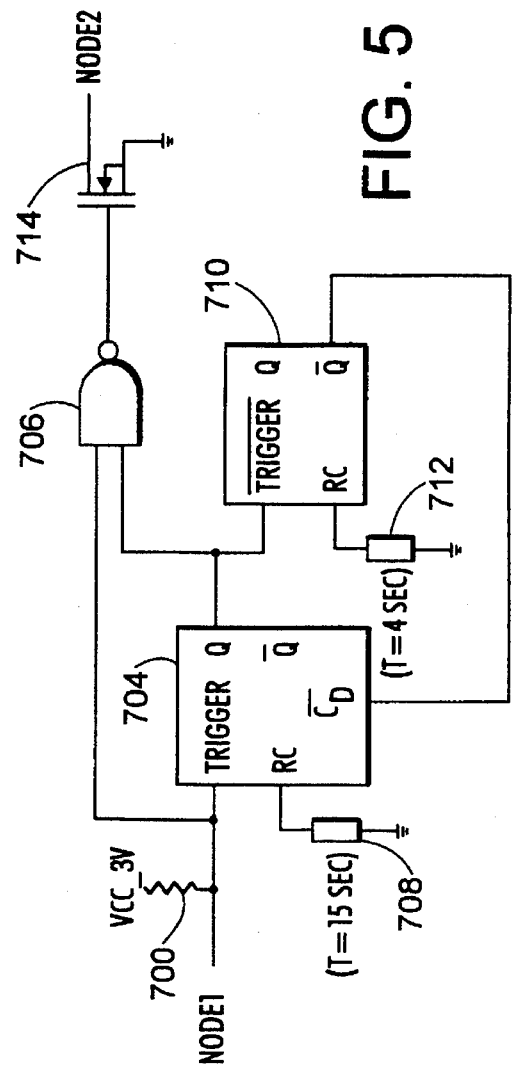
FIG. 5 is a schematic diagram of circuitry used to periodically place the unit on-hook in combination with the circuitry illustrated in FIG. 4.

So turning to FIG. 5, shown is circuitry for insertion between node 1 and node 2 of FIG. 4. The circuitry shown in FIG. 5 is intended to prevent the BSU 2 from staying off-hook too long solely to charge the capacitor. The circuitry of FIG. 5 causes LOW_PWR to pulse low for approximately 4 seconds out of every 15 seconds, even if $V_C$, the voltage of the storage capacitor 664, has not reached its desired value. The purpose for this is to prevent the "TELEPHONE LEFT OFF HOOK" rapid beeping familiar to telephone users when the telephone has been left off-hook for too long.

In FIG. 5, the signal from node 1 is pulled up through a resistor 700 to VCC_3V. Of course, when the output of the comparator 662 goes low, that output will pull the signal at node 1 low. The signal at node 1 is provided to a trigger input of a monostable multivibrator 704 and also to one input of a NAND gate 706. The monostable multivibrator 704 has an impedance network 708 connected to its timing input, that impedance network also being tied to ground. This impedance network 708 is chosen to provide a desired time constant, preferably approximately 15 seconds.

The output of the monostable multivibrator 704 is provided as another input to the NAND gate 706, and also as a trigger input to a second monostable multivibrator 710. This trigger input triggers on the falling edge of the output of the monostable multivibrator 704. The timing input of the monostable multivibrator 710 is further connected through an impedance network 712 to ground, that impedance network 712 providing for a time constant of approximately 4 seconds.

The inverting output of the monostable multivibrator 710 is provided to an active low clear input of the monostable multivibrator 704. This clear input causes the output of the monostable multivibrator 704 to go false when the clear input is active low true. Further, it resets the timing in the monostable multivibrator 704, and, if the trigger input to the monostable multivibrator 704 is high, provides for restarting the time period of the monostable multivibrator 704 when the clear input goes false, or high.

The output of the NAND gate 706 is provided to the gate of an N-channel MOSFET 714, which has its source connected to ground and its drain connected to node 2.

In operation, when node 1, the output of the comparator 662, is true, indicating a low power condition, and the monostable multivibrator 704 triggers. For the next fifteen seconds, both inputs of the NAND gate 706 are high, and thus the MOSFET 714 is off, causing the BSU 2 to stay off-hook. After 15 seconds, the output of the monostable multivibrator 704 goes low, triggering the monostable multivibrator 710. Because the output of the monostable multivibrator 704 is low, the output of the NAND gate 706 likewise goes low, turning the MOSFET 714 on, and placing the BSU 2 back on-hook. After two more seconds, the inverting output of the monostable multivibrator 710 goes from low to high. Because the inverting output was low, this cleared the monostable multivibrator 704. When the inverting output of the monostable multivibrator 710 goes high, this restarts the time period for the monostable multivibrator 704, causing the output of that monostable multivibrator 704 to again go high and again taking the BSU 2 off-hook. This is repeated until the signal at node 1, the output of the comparator 662, again goes low, indicating that the low power condition has been remedied.

Turning to FIGS. 6A and 6B, these show further circuitry that can be incorporated into the circuitry of FIG. 4 to provide for more direct microprocessor control of the off-hook condition. The circuitry in FIG. 6A would replace the circuitry block A of FIG. 4. In this case, the LOW_PWR signal is provided to the gate of a P-channel MOSFET 800. The drain of the P-channel MOSFET 800 is connected to VCC_3V, and the source is connected to ground through a pull-down resistor 802. The gate of the P-channel MOSFET 800 is also pulled up to VCC_3V by a resistor 804. The source of the P-channel MOSFET 800 then provides a logical signal to the microprocessor 430 illustrated in FIG. 2. Two signals are provided, an INTA* signal and a PAx signal. INTA* is tied to the interrupt circuitry of the microcontroller 430 by circuitry illustrated in FIG. 6B, discussed below. The PAx signal is connected to an unused bit of an input port of the microcontroller 430.

To control OFF_HOOK*, the microcontroller 430 provides a separate output, PAy, from another unused bit of an output port. PAy is connected to the gate of a P-channel MOSFET 806. The drain of the P-channel MOSFET 806 receives OH1*, provided by the source of the P-channel MOSFET 688 illustrated in FIG. 4. The gate and drain of the P-channel MOSFET 806 are connected to each other by a pull-up resister 808.

Alternatively, PAy could be combined using an AND gate with the gate input signal of the MOSFET 688, which is provided as VCC_TX_EN. Then, OH1* would replace OFF_HOOK*, thus eliminating the MOSFET 806 and the resistor 808.

Using this circuitry, the microcontroller 430 directly causes the BSU 2 to go off-hook using OFF_HOOK*. When PAy goes high, this turns off the P-channel MOSFET 806, causing the BSU 2 to go off-hook. When PAy is low, the P-channel MOSFET 806 is on, and the state of OFF_HOOK* is controlled by the P-channel MOSFET 688. Of note, when the microprocessor 430 is reset by RESET*, it tristates its ports. In this tristated condition, PAy assumes a high impedance, causing the P-channel MOSFET 806 to turn off, forcing the BSU 2 off-hook. This is preferable, because in a reset state you wish to have power provided by the telephone line.

Figure 7:
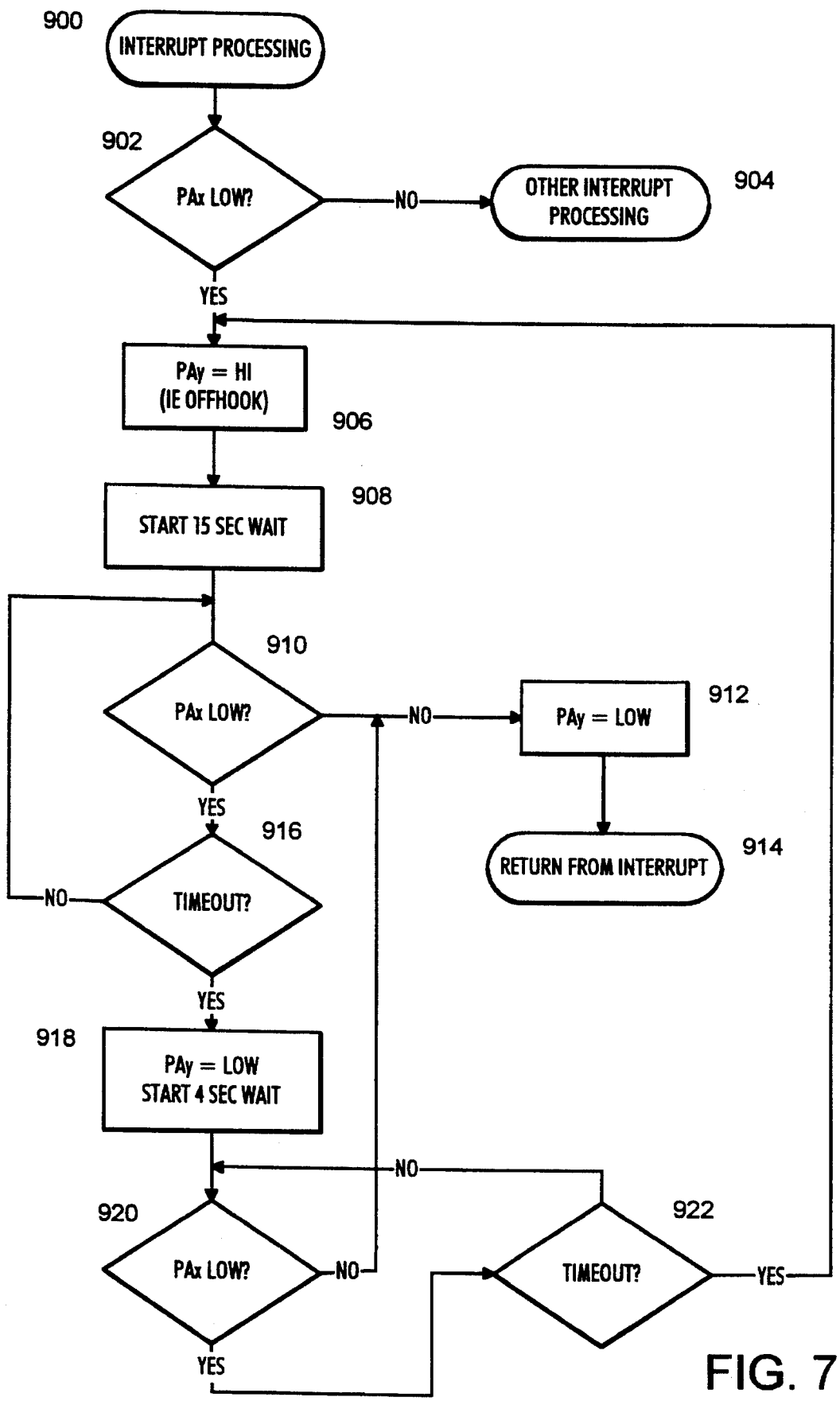
FIG. 7 is a flowchart illustration of an interrupt routine that would be implemented in a microcontroller as illustrated in FIG. 2.

The reason for providing both INTA* and PAx to the microcontroller 430 will be apparent in the discussion of FIG. 7. INTA* generates an interrupt in the microcontroller 430, while the PAx signal provides a readable value so that the microcontroller 430 can determine that the interrupt was in fact caused by LOW_PWR going true.

FIG. 6B shows how the interrupt circuitry in the microcontroller 430 could be generated. INTA* is provided as an input to an AND gate 810, which also receives as inputs other active low interrupt signals. whenever one of these interrupt signals goes low, this forces an INT* input of the microcontroller 430 low, causing a microcontroller interrupt. Further, FIG. 6B also illustrates the signal flow of PAx and PAy.

Turning to FIG. 7, this figure illustrates an interrupt processing routine 900 that would typically be executed in the microcontroller 430 to remedy low power situations. The interrupt processing routine 900 is entered when INT* goes low. Referring to the circuitry in FIG. 6B, it is seen that this would occur, for example, when INTA* goes low. Beginning at step 902, the routine determines whether the interrupt is related to a low power condition or to other processing. It does so by reading the microcontroller PAx input, and determining whether it is low. If it is not low, a low power condition as indicated by LOW_PWR is not the source of the interrupt, so the routine proceeds to step 904 for other interrupt processing.

If at step 902 PAx is low, a low power condition has occurred, so the routine proceeds to step 906, where it sets PAy high. Referring to the circuitry in FIG. 6A, this forces the BSU 2 off-hook, initiating the charging of the storage capacitor 644. The routine then proceeds to step 908, where it sets a 15 second wait period. This can be a separate interrupt, a software timer, or a hardware timer, for example.

The routine then proceeds from step 908 to step 910, where it again determines if PAx is low. If it is no longer low, this indicates the low power condition has been remedied, so the routine proceeds to step 912, where it sets PAy low, thus eliminating the forced off-hook condition. The routine then returns from the interrupt at step 914.

If at step 910 PAx is still low, the routine proceeds to step 916, where it determines whether the 15 second wait period initiated at step 908 has timed out. If not, the routine loops to step 910 to again determine whether the low power condition is still in effect.

If at step 916 the 15 second period has passed, the routine proceeds to step 918, where it sets PAy low, returning the BSU 2 on-hook. The routine also starts a 4 second wait period. Proceeding to step 920, the routine then again checks for PAx no longer being low, as it did in step 910. If PAx is no longer low, the routine proceeds to step 912, where it resets PAy low and returns at step 914.

At step 920, if it was determined that PAx is still low, the low power condition still exists, so the routine proceeds to step 922, where it determines whether the 4 second time out has passed. If not, the routine loops to step 920. If so, the routine proceeds to step 906, to again set PAy high, forcing the BSU 2 off-hook and again looping through the 15 second wait period.

As is apparent from this routine, this procedure is repeated until the storage capacitor 644 is adequately charged.

Turning to FIG. 8, a circuit intended to be used in place of the circuit illustrated in FIG. 5 is shown. This circuit employs DIAL_TONE, provided by the DTMF decoder/encoder 432, to determine when to place the BSU 2 back on-hook. A resistor 1000, a NAND gate 1002, and an N-channel MOSFET 1004 are provided with functions corresponding to the resistor 700, the NAND gate 706, and the MOSFET 714 discussed above in conjunction with FIG. 5. Replacing the two monostable multivibrators 708 and 710, however, is a monostable multivibrator 1006, which has its clear input provided by the signal on node 1 and its timing input connected to ground through an impedance network 1008, providing a 4 second time constant. The inverting edge triggered trigger input of the multivibrator 1006 is provided by DIAL_TONE, and its inverting output is provided as an input to the NAND gate 1002.

In operation, this circuit places the BSU 2 on-hook periodically as does the circuit in FIG. 5. Instead of doing so at arbitrary 15 second intervals, however, this circuit only does so when the dial tone disappears as indicated by DIAL_TONE going low. When the signal at node 1 goes high, this indicates a low power condition. In such a case, the clear input goes high, leaving the multivibrator 1006 in a cleared condition. At this point, the inverting output will be high, so the output of the NAND gate 1002 will be low, turning the MOSFET 1004 off and taking the BSU 2 off-hook. The dial tone then appears, and the circuit continues in this state until the dial tone disappears. When this happens, DIAL_TONE transitions low, firing the multivibrator 1006 for 4 seconds. During this period, the inverting output of the multivibrator 1006 goes low, causing the NAND gate 1002 output to go high, and returning the BSU 2 on-hook for 4 seconds. After this period, the multivibrator 1006 resets, and the cycle repeats. Using DIAL_TONE, however, eliminates the arbitrary 15 second period, replacing it with a period dependant on how long it takes the dial tone to drop out.

Figure 9:
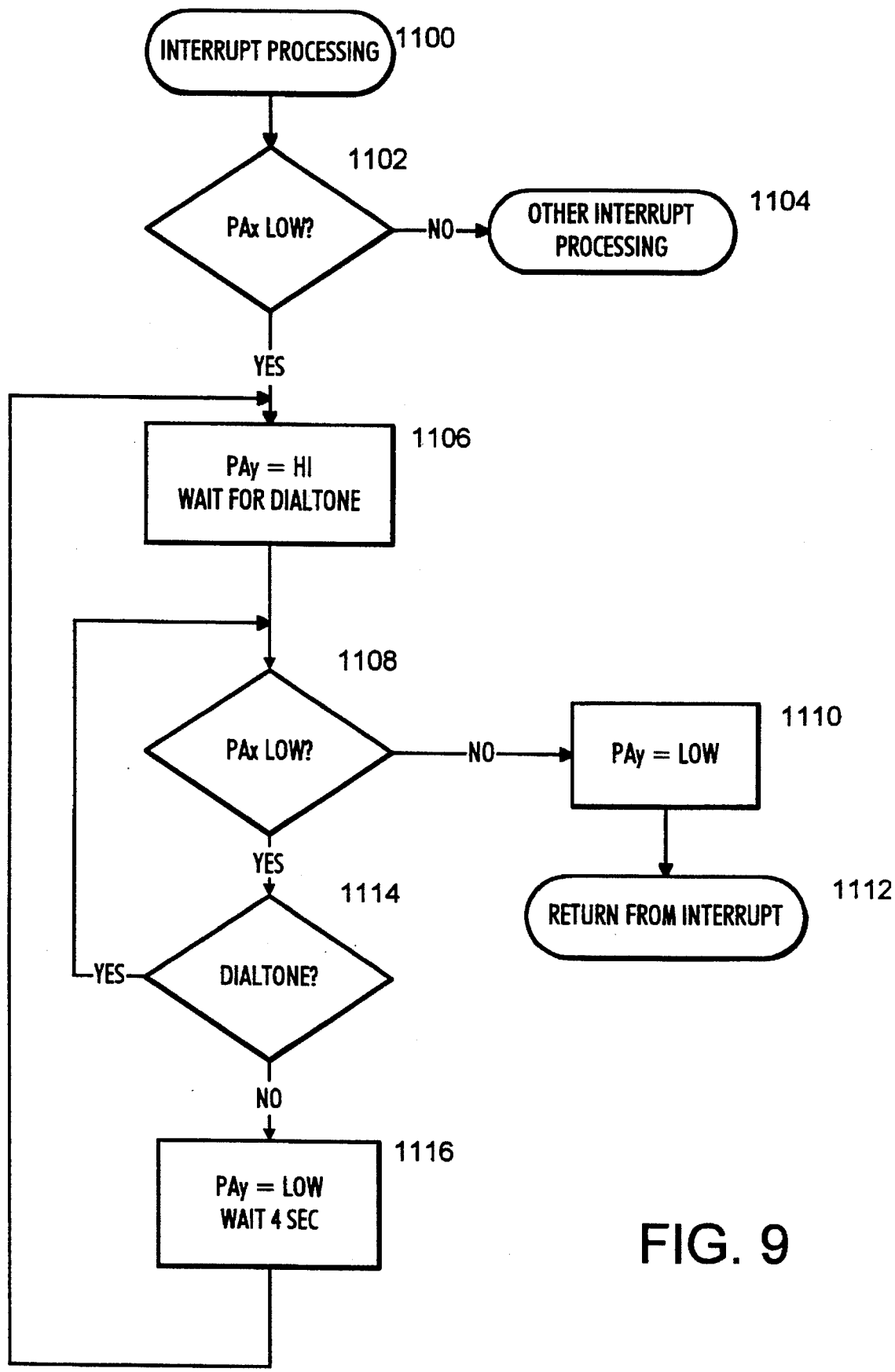
FIG. 9 is a flowchart illustration of an interrupt routine similar to that shown in FIG. 7, but again employing a dial tone signal instead of a timeout loop.

FIG. 9 is a flowchart illustrating an interrupt routine 1100 implemented in the microcontroller 430 similarly using DIAL_TONE. This routine 1100 is similar to the routine 900 illustrated in FIG. 7, but instead of a 15 second timeout, it employs DIAL TONE. Control proceeds from step 1100 to step 1104 as in step 900 to step 904 in the routine 900. At step 1106, however, after setting PAy high, the routine 1100 then proceeds to wait for a dial tone using DIAL_TONE, which is provided to the microcontroller 430 through an unused port bit. This step would preferably would include a no dial tone timeout to prevent lockup should the telephone line be working improperly.

After DIAL_TONE goes true, the routine 1100 proceeds to step 1108, where it determines if PAx is still low. If not, then the capacitor 644 is charged, so the routine 1100 resets PAy low at step 1110 and exits at step 1112.

Otherwise, the capacitor 644 is not charged, so the routine 1100 proceeds from step 1108 to step 1114 where it determines whether DIAL_TONE is still true, indicating dial tone present. If so, the routine loops to step 1108. If not, however, dial tone has dropped out, so the routine proceeds to step 1116. At this step, the equivalent of step 918 to step 922 in the routine 900 are executed, causing a 4 second timeout. The routine 1100 then proceeds to step 1106 to repeat the process.

Again, this procedure has the advantages related to those discussed in conjunction with FIG. 8, in that the initial charging period can be longer or shorter than the arbitrary 15 seconds.

These various techniques and embodiments according to the invention eliminate the expense, inconvenience, and weight of AC adapters generally used to connect telecommunications equipment to the power line. As can be seen from the foregoing disclosure, this permits a telecommunications based device to take power from the telephone line itself, even when that telecommunications based device is not normally off-hook. Further, this circuitry will not interrupt any communication that the unit is performing over the telephone line when the telecommunications unit is off-hook, because in such cases the capacitor stays fully charged. Using this circuitry provides a solution to the problems of maintaining power to telecommunications devices.

Although the disclosed embodiments of the invention were presented in conjunction with a base station/mobile station wireless communication system, it will be readily apparent that the circuitry and techniques according to the invention have broad general application to other devices which are connected to telephone lines. Examples include answering machines and portable modems. Given this disclosure, however, one or ordinary skill in the art will appreciate the broad applicability of the techniques and circuitry according to the invention.

The foregoing disclosure and description of the invention are illustrative and explanatory thereof, and various changes in the size, shape, materials, components, circuit elements, wiring connections, and contacts, as well as in the details of the illustrated circuitry and construction and method of operation may be made without departing from the spirit of the invention.

We claim:

1. A power supply for a device with circuitry requiring a supply voltage of a generally constant voltage, the device connectable to a telephone line, the circuitry including logic for indicating the device is requesting to be taken off-hook, comprising:

means for providing the supply voltage to the circuitry, said supply voltage means including a power input;

a capacitor for providing power to said power input of said supply voltage means, a voltage being present across the capacitor;

means for providing voltage from the telephone line to said capacitor when the device is off-hook;

means for determining when the voltage across said capacitor falls below a first predetermined threshold; and off-hook circuitry for forcing the device off-hook responsive to said means for determining when the voltage across said capacitor has fallen below said first predetermined threshold.

2. The power supply of claim 1, wherein said means for determining when the voltage across said capacitor falls below said first predetermined threshold includes a comparator coupled to said capacitor and to a reference voltage.

3. The power supply of claim 1, wherein said means for determining when the voltage across said capacitor falls below said first predetermined threshold includes an error output from said means for providing the supply voltage.

4. The power supply of claim 1, further comprising:

means for determining when no dial tone is present; and wherein said off-hook circuitry is further responsive to said means for determining when no dial tone is present by returning the device on-hook.

5. The power supply of claim 1, wherein said off-hook circuitry is further responsive to the logic for indicating the device is requesting to be taken off-hook by forcing the device off-hook.

6. The power supply of claim 1, further comprising:

means for determining when the voltage across said capacitor rises above a second predetermined threshold; and wherein said off-hook circuitry is further responsive to said means for determining when the voltage across said capacitor has risen above said second predetermined threshold by placing the device on-hook unless the logic indicates the device is requesting to be taken off-hook.

7. The power supply of claim 6, further comprising:

means for periodically indicating that the device should be returned on-hook after being taken off-hook; and wherein said off-hook circuitry is further responsive to said means for periodically indicating that the device should be returned on-hook by placing the device on-hook unless the logic indicates the device is requesting to be taken off-hook.

8. The power supply of claim 1, wherein said off-hook circuitry comprises a microcontroller, said microcontroller being responsive to said means for determining when the voltage across said capacitor falls below said first predetermined threshold by indicating the device should be taken off-hook.

9. The power supply of claim 8, further comprising:

means for determining when no dial tone is present; and wherein said microcontroller indicates that the device should be placed on-hook in response to said means for determining when no dial tone is present indicates that no dial tone is present.

10. The power supply of claim 8, wherein said microcontroller indicates that the device should be placed on-hook after a predetermined period of being off-hook.

11. The power supply of claim 1, wherein said means for providing voltage to said capacitor comprises:

a switch coupled between the telephone line and said capacitor; and means for activating said switch when a predetermined sufficient voltage is being provided by the telephone line.

12. The power supply of claim 11, wherein said means for providing voltage to said capacitor further comprises a voltage regulator connected between the telephone line and said switch.

13. An electrical device for communicating data over a telephone line and over a radio frequency channel, comprising:

circuitry for communicating data over the telephone line and the radio frequency channel, said circuitry requiring a supply voltage of a generally constant voltage, and said circuitry including logic for indicating the device is requesting to be taken off-hook;

means for providing the supply voltage to said circuitry, said supply voltage means including a power input;

a capacitor for providing power to said power input of said supply voltage means, a voltage being present across the capacitor;

means for providing voltage from the telephone line to said capacitor when the device is off-hook;

means for determining when the voltage across said capacitor falls below a first predetermined threshold; and off-hook circuitry for forcing the device off-hook responsive to said means for determining when the voltage across said capacitor has fallen below said first predetermined threshold.

* * * * *